(No Model.)
L. J. STANTON.
CLAMP FOR HARROW TEETH.
No. 271,938. Patented Feb. 6, 1883.
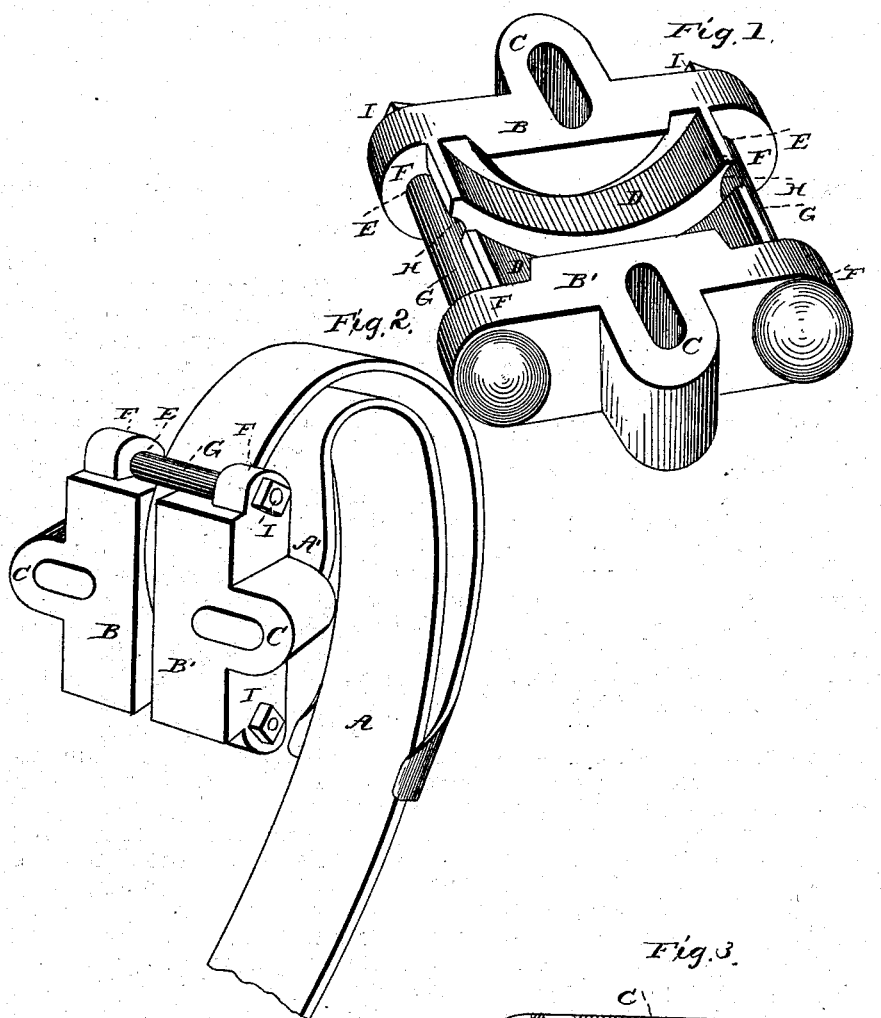
WITNESSES:
Fred. G. Dieterich.
Jno. H. Stockett.
Lafayette J. Stanton
INVENTOR,
by Louis Bagger & Co.
ATTORNEYS.

UNITED STATES PATENT OFFICE.

LAFAYETTE J. STANTON, OF MILLBROOK, MICHIGAN, ASSIGNOR OF ONE-HALF TO STEPHEN E. CHAPMAN, OF SAME PLACE.

CLAMP FOR HARROW-TEETH.

SPECIFICATION forming part of Letters Patent No. 271,938, dated February 6, 1883.

Application filed October 7, 1882. (No model.)

*To all whom it may concern:*

Be it known that I, LAFAYETTE J. STANTON, of Millbrook, in the county of Mecosta and State of Michigan, have invented certain new and useful Improvements in Clamps for Harrow-Teeth; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the inner or under side of my tooth clamp or fastener. Fig. 2 is a perspective view of the tooth with its clamp, and Fig. 3 is a longitudinal sectional view of one of the halves or parts of the clamp or fastener.

Similar letters of reference indicate corresponding parts in all the figures.

My invention has relation to clamps for fastening harrow-teeth upon the tooth-bars of a harrow-frame; and it consists in the construction and arrangement of parts of a clamping device adapted for fastening the spring-teeth, shown and described in my Letters Patent, No. 264,360, bearing date of September 12, 1882.

In the accompanying drawings, the letter A denotes a harrow spring-tooth of the construction shown in the aforesaid Letters Patent, having a bend or recurve, A', at the point where it is fastened to the tooth-bar.

The clamp consists of two parts, B and B', constructed exactly alike, so that a detailed description of one will answer for both. Each part has a projecting slotted ear, C, a curved groove or channel, D, conforming in shape to the curvature of part A' of the tooth, and two bolt-holes, E E—one at each end—cut through projections F F at the ends of the part or casting. To make room for the bolts G G, inserted through these holes, semi-cylindrical recesses H are cut in the ends of the parts next to the bolt-holes.

To use the clamp, the parts B and B' are placed upon the recurved top part, A', of the tooth—one on each side—and united by the end bolts, G G, the sides of the tooth fitting into the curved channels D D, which register with each other. The parts B and B' are then clamped against the part of the tooth inserted between them by screwing up the nuts I I, after which the clamp is attached to the tooth-bar by bolts inserted through the slotted ears C C.

It will be seen that by this device the tooth is not weakened or its elasticity or "springiness" affected by boring holes through it. The tooth may be attached to or detached from the harrow-frame in a moment of time, and it will, when attached, remain rigidly in its proper position without liability to work itself loose, however hard and rough the soil.

I am aware that clamps for harrow-teeth have been made before composed of two separable pieces bolted together, so as to clamp the curved portion of the tooth between them, and provided with means for their attachment to the tooth-bars of the harrow-frame. Nor do I claim such construction, broadly; but

What I claim, and desire to secure by Letters Patent of the United States, is—

1. The harrow-tooth clamp or fastening device composed of the parts or halves B and B', constructed alike, each having a slotted ear, C, curved groove or channel D, end projections, F F, having bolt-holes E E and bolt-recesses H H, and nutted bolts G G, connecting said parts B and B', substantially as and for the purpose herein shown and described.

2. The combination, with the harrow-tooth A, having recurved part A', of the clamping device composed of the parts B and B', constructed with slotted ears C, curved channels D, end projections, F, having bolt-holes E and bolt-recesses H, and nutted bolts G G, constructed substantially as and for the purpose herein shown and specified.

In testimony that I claim the foregoing as my own I have hereunto affixed my signature in presence of two witnesses.

LAFAYETTE J. STANTON.

Witnesses:
NORMAN W. ALLEN,
WALTER S. HOWD.